United States Patent

[11] 3,597,022

| [72] | Inventor | Robert D. Waldron |
| | | 5620 N. 69th Pl., Scottsdale, Ariz. 85253 |
| [21] | Appl. No. | 843,458 |
| [22] | Filed | July 22, 1969 |
| | | Continuation-in-part of Ser. No. 611,204, Dec. 27, 1966 |
| [45] | Patented | Aug. 3, 1971 |

[54] DIAMAGNETIC LEVITATION AND/OR STABILIZING DEVICES
11 Claims, 17 Drawing Figs.

[52] U.S. Cl. .................................................. 308/10
[51] Int. Cl. ....................................................... F16c 39/06
[50] Field of Search ............................................ 308/10; 73/505, 517; 74/5.6

[56] References Cited
UNITED STATES PATENTS

| 3,225,608 | 12/1965 | Simon | 74/5.6 |
| 3,358,945 | 12/1967 | Blount | 308/10 |
| 3,428,370 | 2/1969 | Steingroever | 308/10 |
| 3,428,371 | 2/1969 | Lyman | 308/10 |
| 3,447,842 | 6/1969 | Steingroever | 308/10 |
| 3,465,598 | 9/1969 | Simon | 308/10 |
| 3,488,531 | 1/1970 | Rosensweig | 308/10 |

Primary Examiner—Milton O. Hirshfield
Assistant Examiner—R. Skudy
Attorney—Wm. H. Dean

ABSTRACT: Diamagnetic levitation and/or stabilizing devices, wherein diamagnetic members are levitated in relation to permanent magnets. Said magnets in repulsion levitation relative to each other are stabilized along one or more desired axes by means of diamagnetic members disposed about said axes, and in relation to fields of permanent magnets.

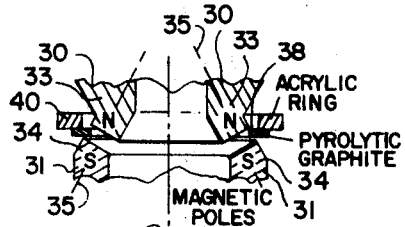
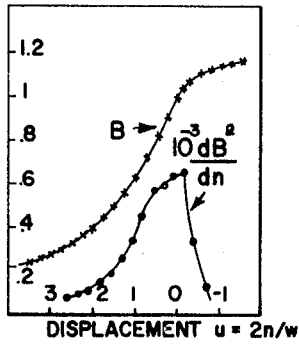
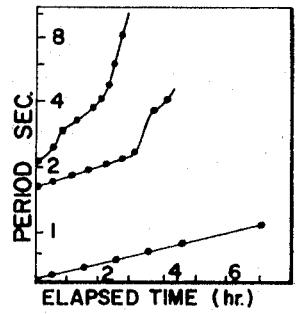
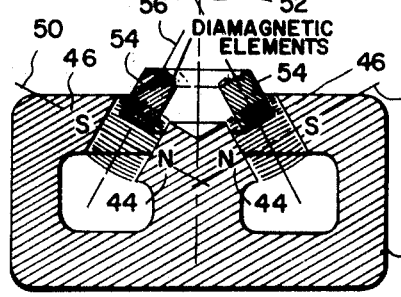
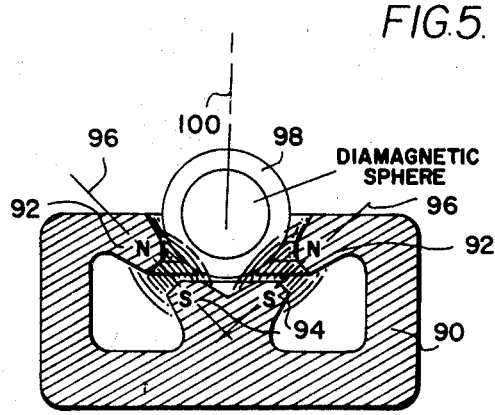
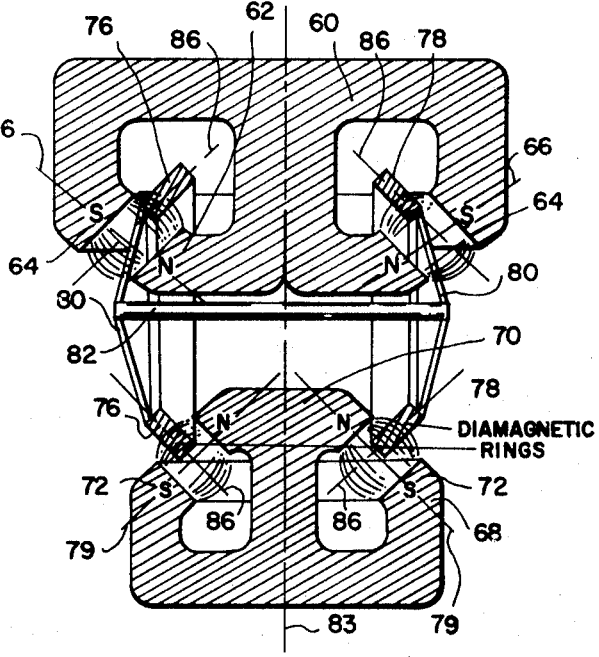
FIG. 1. FIG. 2. FIG. 3. FIG. 4. FIG. 5. FIG. 6. FIG. 7.
INVENTOR.
ROBERT D. WALDRON

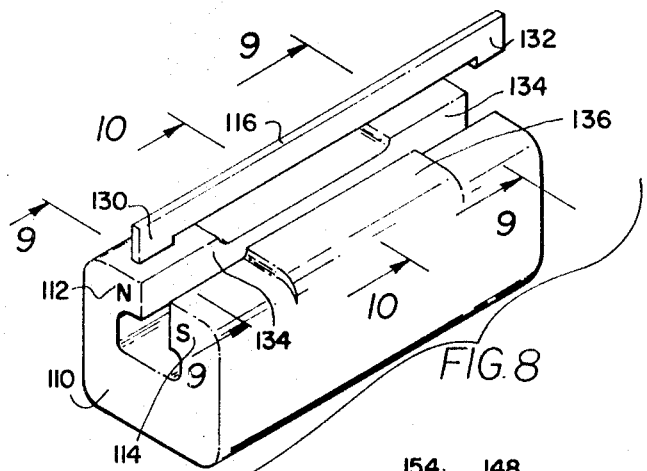
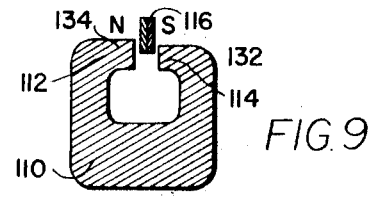
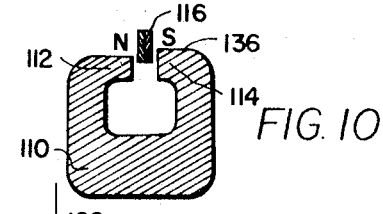
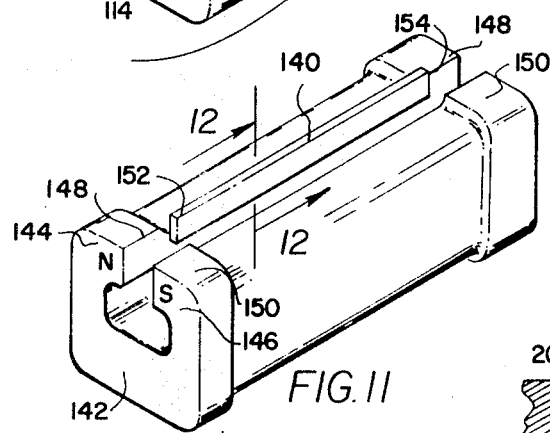
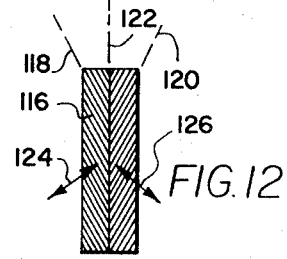
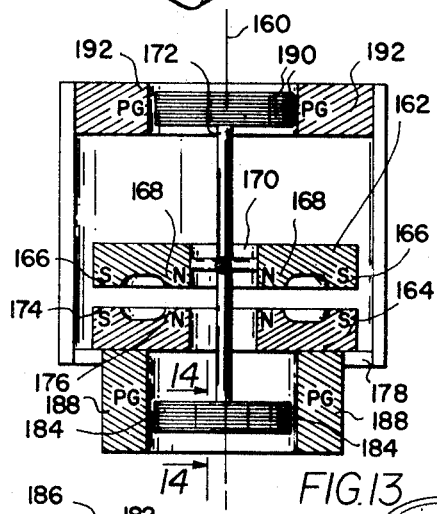
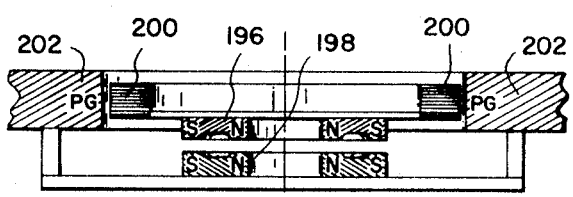
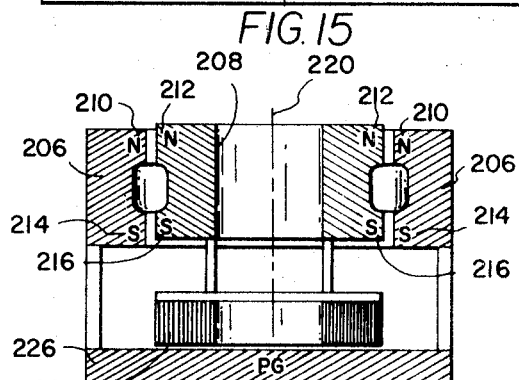
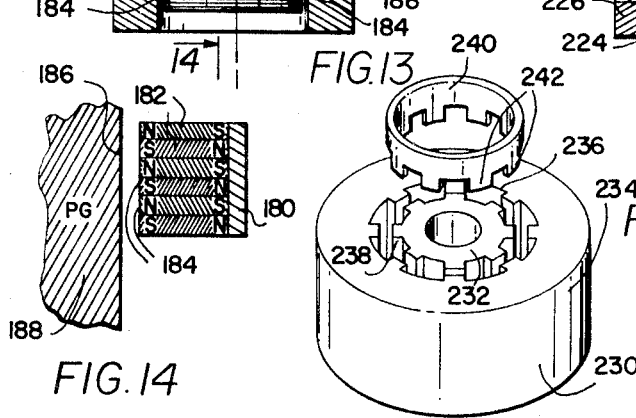
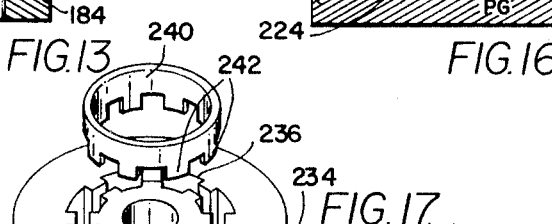
INVENTOR.
ROBERT D. WALDRON

DIAMAGNETIC LEVITATION AND/OR STABILIZING DEVICES

This application is a continuation-in-part of my abandoned U.S. Pat. application Ser. No. 611,204, filed Dec. 27, 1966.

Attention is hereby directed to known prior art, and particularly, publications, as follows:

1. A. M. Garber, Aerospace Eng. 22, 217 (1968).
2. C. A. Klein and W. D. Straub, Phys. Rev. 123, 1581 (1961).
3. D. B. Fishbach, Phys. Rev. 123, 1613 (1961).
4. D. B. Fishbach, Proceedings of the 5th Carbon Conference (Pergamon Press, Inc., New York, 1963), Vol. II, p. 27.
5. H. T. Pinnick and P. Kiive, Phys. Rev. 102, 58 (1956).
6. A. B. Boerdijk, Philips Res. Rept. 11, 45 (1956).
7. W. von Braunbek, Ann. Physik 11s, 764 (1939).
8. The subscripts $pn$ and $in$ refer to peak negative and least negative values of the gradient. Since $x$ is negative, a negative gradient is required for levitation if one retains the usual convention of the positive $z$ axis extending vertically upward. We shall use the expressions peak negative and least negative instead of minimum and maximum to avoid ambiguity due to sign.
9. This may be compared with the value $-570$ tesla$^2$/m. obtained by Boerdijk (Ref. 7) for polycrystalline graphite.
10. J. T. Harding, International Advances in Cryogenic Engineering (Plenum Press, New York, 1965), Vol. 108, p. 137.
11. A. Nordsieck, Progress in Astronautics and Rocketry (Academic Press, Inc., New York, 1962), Vol. 8, p. 435.
12. J. W. Beams, D. M. Spitzer, Jr., and J. P. Wade, Jr., Rev. Sci. Instr. 33, 151 (1962).
13. "Magnetic Bearings for Aerospace Applications," Tech. Rept. ASD-TDR-63-474 USAF (Defense Documentation Center AD 412813).
14. Indiana General Corporation.
15. To evaluate $w_o$, we note from the previous equation $$\left[\frac{dB^2}{dz}\right]_{\text{ln}} = -4\left(\frac{Bo}{\pi}\right)^2 \frac{1}{w_o} \left(\frac{\text{arccot } Upn}{a+Upn^2}\right),$$

or $$w_o = -4\left(\frac{Bo}{\pi}\right)^2 \left(\frac{1.837}{1.074}\right) / \left[\frac{dB^2}{dz}\right]_{\text{ln}}$$

$$= -4(1.710)\left(\frac{Bo}{\pi}\right)^2 / \left[\frac{dB^2}{dz}\right]_{\text{ln}}$$

The foregoing references are cited in order to form a basis for reference, as will be hereinafter made, in the following specification:

It is an object of the present invention to provide diamagnetic levitation and/or stabilizing devices having novel structural characteristics which provide for an improved load capacity for a given magnet configuration or conversely provide greatly reduced weight and volume of a magnetic assembly for a given load.

Another object of the invention is to provide diamagnetic levitation and/or stabilizing devices, wherein permanent magnets maintain magnetic fields which are of a conical configuration or an inverted conical configuration to provide both vertical and horizontal diamagnetic influence relative to diamagnetic means to thereby accomplish levitation and stabilization of the diamagnetic means about several axes and to allow 6° of freedom of the diamagnetic means relative to the permanent magnet means.

Another object of the invention is to provide diamagnetic levitation and/or stabilizing devices which have many uses, wherein requirements dictate low friction relative to movement along or about one or more axes.

Another object of the invention is to provide diamagnetic levitation and/or stabilizing devices particularly adapted for the use of pyrolytic graphite diamagnetic members in relation to the magnetic fields of permanent magnets.

Further objects and advantages of the present invention claims, and accompanying drawings, in which:

FIG. 1 is a fragmentary axial sectional view of an annular permanent magnetic field structure surrounded by a diamagnetic ring, shown loaded by an acrylic ring in accordance with the present invention;

FIG. 2 is a graphic illustration disclosing magnetic field characteristics of the invention, illustrated in FIG. 1;

FIG. 3 is a further graphic illustration indicating performance of the invention, as shown in FIG. 1;

FIG. 4 is an axial sectional view of an annular permanent magnet and diamagnetic element, in accordance with the present invention;

FIG. 5 is a sectional view, showing a pair of diamagnetic rings in relation to a pair of permanent magnets, all shown in axial section about the axis of the diamagnetic rings;

FIG. 6 is a sectional view of a permanent magnet and a diamagnetic sphere, in accordance with the invention;

FIG. 7 is a sectional view of a diamagnetic plate upon which are supported a plurality of permanent magnets maintained in spaced relationship to each other;

FIG. 8 is a perspective view of an elongated C-shaped in cross section permanent magnet, and illustrating a balance bar in exposed relation to the permanent magnet;

FIG. 9 is a cross-sectional view taken from the line 9-9 of FIG. 8;

FIG. 10 is a cross-sectional view taken from the line 10-10 of FIG. 8;

FIG. 11 is a view similar to FIG. 8, and showing a modification of the structure disclosed therein;

FIG. 12 is a sectional view taken from the line 12-12 of either FIG. 8 or FIG. 11;

FIG. 13 is an axial sectional view of a pair of permanent magnets in repulsion disposition relative to each other, and showing diamagnetic means of the invention for stabilizing the permanent magnets in a horizontal plane;

FIG. 14 is a fragmentary enlarged sectional view taken from the line 14-14 of FIG. 13;

FIG. 15 is a view similar to FIG. 13, but showing a modification of the same general combination, as shown in FIG. 13;

FIG. 16 is an axial sectional view of a pair of concentric permanent magnets in repulsion relationship to each other, and showing diamagnetic means of the invention in connection therewith, and adapted to resist axial thrust loads in a direction longitudinally of the axis of the concentric permanent magnet means; and FIG. 17 is a perspective exploded view of a further modification of the invention, showing portions broken away and in section to amplify the illustration.

Recent advances [1,2] in the production of pyrolytic graphite forms in useful sizes and geometries with reported values [3,4] of negative magnetic susceptibility comparable to single crystal graphite have prompted a reexamination of the feasibility of supporting useful loads by diagrammatic levitation. For example, the susceptibility of single crystal graphite for flux perpendicular to the layer planes is approximately three to 10 times the isotropic values for various polycrystal line graphites [5], while pyrolytic graphites may have even greater (negative) values depending on heat treatment. This leads to substantially improved load capacity for a given magnet configuration or conversely to greatly reduced weight and volume of a magnet assembly for a given load.

We have reviewed the literature on diamagnetic levitation and extended the previous analyses to include anisotropic susceptibilities and parametric studies. The results of this study culminated in the design, fabrication, and testing of a magnetic bearing of extremely low intrinsic friction.

The general technical requirements for diamagnetic levitation have been presented previously [6,7], but are outlined below to facilitate the subsequent discussion.

I. THEORY

The magnetic pressure exerted across a boundary between the Maxwell stress tensor. Thus, for the case of flux lines parallel to the boundary, the tangential component of magnetic field $H_t$ must be equal on both sides of the surface, while the flux densities inside and outside are given, respectively, by $B_i = \mu_i H$ and $B_o = \mu_o H$. Since the magnetic stress $\tau = B \cdot H/2\gamma$, (where $\gamma=1$ in m.k.s. and $4\pi$ in c.g.s. systems) the unbalanced pressure exerted on the surface, $\Delta P = (B_o - B_i) \cdot H/2\gamma = (\mu_o - \mu_i)H^2/2\gamma = -X_o H^2/2 = _x B^2/2_o$, where $\gamma_x = _i/\mu_o - 1$. This also represents the energy density of the diamagnetic material in a magnetic field. The pressure gradient $d\Delta P/dz$ which develops in an inhomogeneous field is given by $d\Delta P/dz = (X_{\mu_o}/2)(dH^2/dz) = (X/2_o)(dB^2/dz)$.

II. STATIC DESIGN PARAMETERS

The ratio of load (force) to diamagnetic weight $L/W = -(\Delta P_u - \Delta P_i)/\Delta z pg = (X/2\mu_o)(B_u^2 - B_i^2)/\Delta z pg$, where $u$ and $l$ refer to upper and lower surface, $p$ = mass density, and $g$ = acceleration of gravity. This ratio reaches a maximum as $z \to 0$ at a point where the gradient $|d\Delta P/dz|$ is a maximum giving $(L/W)max = |d\Delta P/dz|_{max} pg = (X/2\mu_o pg) X(dB^2/dz) pn.^8$ To achieve levitation, $L/W \geq 1$, which requires a peak negative gradient of flux density squared, $(dB^2/dz)_{pn} \leq 2\mu_o pg/X$. The least negative (limiting) gradient necessary to levitate pyrolytic graphite $(dB^2/dz)_{1n}$ is readily obtained from the previous equation. Substituting the following typical values for physical constants of pyrolytic graphite, density $p=2.22 \times 10^3$ kg./m.$^3$, volume susceptibility $X=4\pi pk/\gamma = -5.6 \times 10^{14}$ (m.k.s.) [using $K=20 \times 10^{16}$ cm.$^3$/g. (e.m.u.)], we obtain $(dB^2/dz)_{1n} = -97$ $Wb^2/m.^5$(tesla$^2$/m.).$^9$ The value of $dB^2/dz$ depends on the flux density and radius of curvature $r$ of the flux lines (which in turn, are limited by the maximum flux density $B_o$ and the gap width $w$). Thus, from consideration of the Maxwell stress tensor, $(dB^2/dz) = -B^2/r > -2B_o^2/w$ which yields an upper limit to the maximum gap width $w_{max} < -2B_o^2/(dB^2/dz)_{1n}$. A more detailed analysis based on geometrically useful field gradients (Appendix A) leads to $w_o = w_{max} = -4(1.710) \times (B/\pi)^2/(dB^2/dz)_{1n} = -0.693 B_o^2/(dB^2/dz_{1n})$. For pyrolytic graphite with $B_o=2$ tesla this latter criterion gives $w_{max} = 0.0286$m., while for $B_o=1$ tesla, $w_{max}$ drops to 0.0071m.

The maximum net load $(L-W)_{max}$ is obtained by sizing the diamagnet to fill the portion of the gap volume for which $(dB^2/Z) \leq 2\mu_o pg/X$. The corresponding value of $L/W$ is given by $(dB^2/Z)_{av}/(dB^2/dz)_{1n}$ where the subscript $av$ indicates the average value over the space occupied by the diamagnet. Thus, $L-W = (X/2_o) V \cdot f(B)$, where $f(B) = (dB^2/dz)_{av} - (dB^2/dz)_{1n}$ and $V$ is the diamagnet volume.

The optimum gap width $w_{opt}$ for maximum net load with a fixed clearance $\Delta x$ can be calculated by differentiating $L-W$ with respect to $w$ for any assumed flux distribution $B=B(x,y,z)$. An approximate analysis valid for linear or annular magnet gaps is given in Appendix A which indicates the optimum gap width $w_{opt}$ approaches $(\frac{1}{4}) w_{max}$ as the clearance approaches zero.

A further analysis (Appendix B) gives the maximum net load per unit lateral gap length $[(L-W)/C]_{max} = (X/2\mu_o) \cdot B_o^4 (0.098)/(dB^2/dz)_{1n} = 0.225 B_o^4$ newton/meter for pyrolytic graphite.

III. DYNAMICAL PARAMETERS

For a rigid diamagnet, the magnetostatic energy $U_m$ may be expanded in a power series in horizontal $(x)$, vertical $(z)$, and torsional $(\beta)$ coordinates as follows:

$$U_m(x,z,\beta) = U_o + (\partial U/\partial x)x + (\partial U/\partial z)z + (\partial U/\partial \beta)\beta$$
$$+ 1/2[(\partial^2 U/\partial x^2)x^2 = (\partial^2 U/\partial z^2)z^2 = (\partial^2 U/\partial \beta^2)\beta^2$$
$$+ 2(\partial^2 U/\partial x \partial z)xz + 2(\partial^2 U/\partial x \partial \beta)x\beta$$
$$+ 2(\partial^2 U/\partial z \partial \beta)z\beta] + \ldots$$

For a symmetrical ring magnet, $U_m(x,z,\beta) = U_m(-x,z,-\beta)$ so $\delta U/\delta x$, $\delta U \delta \beta$, $\delta^2 U/\delta x \delta z$, and $\delta^2 U/\delta z \delta \beta = 0$.

The force exerted on a unit arc length of the diamagnet may be treated as the vector sum of the forces normal to the four forces which, in turn, are given by the gradients of the corresponding surface energies.

Thus, the incremental surface energy $\Delta U_i$ due to an increase in depth $\Delta s$ over the area $A_i$ is given by $\Delta U_i = -(X/2\mu_o) <B_i^2> av A_i \Delta s = -(X/2\mu_o) <B^2 \cos^2\Phi> av(A_i \Delta s)$, where $<>av$ indicates average over the surface element. Then $$\frac{\partial U}{\partial s} = \lim_{\Delta s \to 0} \frac{\Sigma \Delta U_i}{i \Delta s},$$

where $s$ may be $\pm (x \text{ or } z)$, and the sum is carried out over surfaces normal to the chosen coordinate. Also, $$\partial^2 U/\partial s^2 = \lim_{\Delta s \to 0} \frac{\Sigma \partial}{\partial s} \frac{\Delta U_i}{\Delta s} = -\left(\frac{X}{2\mu_o}\right) \cdot \Sigma^{A_i} \left[ \left(\frac{\partial \langle B_i^2 \rangle av}{\partial s}\right) \langle \cos^2 \phi_i \rangle \, av + \langle B_i^2 \rangle av \left(\frac{\partial \langle \cos^2 \phi_i \rangle av}{\partial s}\right) \right].$$

For stable levitation to occur, $\delta U/\delta z$ must equal the negative total weight, $-W_t = -M_t g$ at some point in space and concurrently all nonvanishing second derivatives must be positive.

Perhaps the simplest geometry meeting these conditions is a conical gap or flux pattern with a ring diamagnet. Any lateral or torsional displacement yields a positive restoring force, while the vertical (buoyant) force may be adjusted to equal the ring weight. This geometry was used in both experimental bearings.

IV. EXPERIMENTAL BEARING

An experimental vertical thrust bearing was constructed to investigate the behavior of diamagnetic elements and to measure dynamical properties, especially drag coefficients and damping phenomena. FIG. 1 shows the assembled unit. Due to the immediate availability of a flat sample of pyrolytic graphite, a design employing a horizontal graphite ring was adopted instead of the more efficient conical ring. This also necessitated using a smaller than optimum spread to the magnetic field in order to develop the largest possible vertical component of $B$ consistent with stability.

The following constants were determined for the ring, stable range of rotor total mass = 3.60–4.49 g., operational mass = 3.843 g., axial radius of inertia $\gamma_{rms} = 2.064$ cm., axial movement of inertia $I_a=1.64 \times 10^{16}$ kg.m.$^2$, diametral moment of inertia $I_d \approx I_a/2$, graphite mass = 0.933 g., O.D. = 3.99 cm., I.D. = 3.35 cm., and $t=0.114$ cm. The gap width $W=0.200$ cm., and $B_o=1.16$ tesla.

The magnetic field in a gap was plotted with a Hall effect gaussmeter with a subminiature probe, and the graph is shown in FIG. 2. The three major design parameters are vertical load $L_v$, vertical stiffness $dL_v/dz$, and horizontal stiffness $dF/dx$. In principle, these parameters may be calculated by numerical methods if a complete flux map is available, but the task is laborious and not too useful for general design information. If one neglects the curvature of flux lines, one can quickly estimate the parameters from the existing flux plot.

Thus, if the flux lines are parallel to a 30° cone, vertical $(z)$ or radial $(-s)$ displacements of $1/\sin 30°$ or $1/\cos 30°$, respectively, are magnetically equivalent to a unit displacement $n$ normal to the flux lines. Then for a horizontally layered anisotropic diamagnet $\Delta U_s = -(X/2\mu_o) \cdot B^2 \cos^2 30°$. $A\Delta s$, where $X=X_z$ and $X_x=X_y=0$. Neglecting the outer circumference, with $A=\pi(i.d.)t 1.2 \times 10^{14}$m.$^2$, $\Delta s = -\tan 30° \Delta Z$, $X/2\mu_o = -223$, we obtain $\Delta U/\Delta z = (X/2\mu_o) B_i^2 \sin 30° \cos 30° (A) = -0.0116 B^2$ newtons. Since $B$ in the gap $\approx 1.1$ tesla, we obtain $\delta U \delta z \approx -0.0141 N = 1.44$ g. which is only 37 percent of the actual load.

To evaluate stiffness we note $\delta^2 U/\delta z^2 = (X/2\mu_o) \cos 30° \sin 30° (A)(\delta B^2/\delta z)$, but $\Delta n = \sin 30° \Delta z$ and $\delta B^2/\delta n \approx -600$ so $\delta^2 U/\delta z^2 = (X/2\mu_o) \cos 30° \sin^2 30° (A) \delta B^2/\delta n = 3.48$ N/m.=3.55g./cm.

For horizontal stiffness we have $$\frac{\partial^2 U}{\partial x^2} = \frac{\partial^2 U}{\partial s^2} \cdot \frac{\partial \langle s^2 \rangle av}{\partial x^2} = \frac{1}{2} \frac{\partial^2 U}{\partial s^2} = -\frac{1}{2} \left(\frac{x}{2\mu_o}\right) \cos^2 30° (A) \frac{\partial B^2}{\partial s};$$

but $\Delta_n = -$ cp. 30° $\Delta_s$ or $$\frac{\partial^2 U}{\partial^2} = \frac{1}{2} \cdot (X/2\mu_o) \cos^3 30°(A) \frac{\partial B^2}{\partial n}$$

$$= \frac{\cot^2 \theta}{2} \cdot \frac{\partial^2 U}{\partial z^2} = 5.2 N/m = 5.3 g./cm.$$

While direct static instrumentation for measurement of forces was considered, it proved easier to study the vibratory behavior of the ring to determine stiffness. Accordingly, the ring was excited with subaudio pressure waves from a loudspeaker driven by a low frequency signal generator and amplifier and the resonant frequencies observed. The 6° of freedom of the ring (considered as a rigid body) give rise to five vibrational modes, since no restoring force exists for z axis rotation. There are only three distinct frequencies, however, since $x$ and $y$ axes are equivalent for both translation and rotation. By symmetry, the vertical vibration involves pure translational motion along the $z$ axis, while the two remaining modes involve coupling of $x$ translation and $y$ rotation.

The observed frequencies were vertical—11.4 cp.s., horizontal—4.7 and 13 cp.s. The vertical force constant $K_r$ may be immediately obtained by $K_r = -\delta^2 U/\delta z^2 = -\omega_z^2 m. = -4\pi^2 f_r^2 m. = -19.7 N/m$.

The horizontal modes are determined by the three force constants $K_x = -\delta^2 U/\delta x^2$, $K_\beta = -\delta^2 U/\delta \beta^2$, and $K_{x\beta} = -2\delta^2 U/\delta x \beta$, while only two frequencies are known. However $K_\beta$ is physically related to $K_r$ since both arise from energy changes due to vertical displacement of elements of the ring. Thus, $\Delta U = -1/2 K_\beta \beta^2 = -k/2 K_r$ $_{3.33}\times_{10}<z^2>$, where $<z^2>$ is the mean square vertical displacement for a rotation $\beta$. But $z = r\beta \cos\theta$ and $<z^2>_{at} = r^2 \beta^2 <\cos^2\theta>_{at} = (1/2)r^2\beta^2 =$ where $r=1.84$ cm. and then $K_\beta = 1/2 r^2 K_r = -3.33\times 10^{-3}$ Nm./rad.

To solve the dynamical problem, it is convenient to replace the variable $\beta$ with a linear displacement $z_o = r'\beta$, where $r' = 1.46$ cm. is the lateral radius of inertia so that the kinetic energy is isotropic; i.e., $T = (1/2)m.(x^2+z_o^2)$. This leads to normal modes which are physically perpendicular. Thus, $Q_1 = x \cos\alpha + z_o \sin\alpha$ and $Q_2 = X\sin\alpha - z_o \cos\alpha$. Substitution into the equations of motion leads to the following values: $\alpha = 48°$, $K_z = -13.34$ N/m., $K_{zo} = K_\beta/r'^2 = -15.62$ N/m., and $K_{rz0} = -22.1$ N/m.

These values are, again, somewhat higher than those obtained from the rough calculation.

V. DYNAMIC LOSSES

Energy dissipation occurs for relative motion between diamagnets and magnetic poles. These losses may be divided into electromagnetic and mechanical losses. The electromagnetic losses arise from fluctuations in magnetic or electric fields due to nonuniformity of magnetic or diamagnetic elements in the former case, or electrostatic charge distribution in the latter case. Fluctuations of $B$ lead to eddy current losses, while fluctuations of $E$ lead to dielectric hysteresis and radiation losses. The mechanical losses may be considered to be viscous drag and damping both in the medium surrounding the rotor and in the magnetic elements (viscoelasticity).

The predominant electromagnetic loss consists of eddy current dissipation in the diamagnet, which can be analyzed in the terms of the spatial fluctuations in flux density.

An investigation was performed on the experimental bearing by inserting the apparatus in a vacuum bell jar to minimize air drag and measuring the deceleration rate of the rotor following initial spinup. In the longest run (7¼ hr.), the rotor was brought up to 98.5 r.p.m. with a tangential capillary air bleed, after which the bleed air was shut off and the vacuum maintained below $2.8\times10^{15}$ Torr. The angular velocity was measured at regular intervals by using a stopwatch to time 20 revolutions. The increase in period of rotation $T$ with time is shown in FIG. 3. The increase in $\ln T$ is linear in time with a slope, $k = d\ln T/dt = -d \ln \omega/dt = 2.22\times10^{15}$ sec.[11] and a characteristic time $l = l/k = 4.5\times10^4$ sec. $= 12.5$ hr. The drag torque $L = dH/dt = -I\omega k = -3.64\times10^{111} \omega mN$. The corresponding power dissipation $P = -L\omega = 3.64\times10^{111}\omega^2 W$, which had an initial value $AP\Delta v(M/2\pi RT)^{1/2}$, where $\Delta v$ is the mean velocity different, $A$ is the area, $P$ is the pressure, $M$ is the molecular weight, $R$ is the gas constant, ant $T$ is the temperature. If we let $A=2\pi rh = 9.5\times 10^{-4}$ m². $P=2.8\times10^{-5}$ Torr $=3.74\times10^{-3}$ N/m². $v=r\omega=0.0238\omega$, $M=0.029$ kg./GMW, $R=8.31$ J/GMW ° K., $T=300°$ K., we obtain $d(m\Delta v)/dt=1.15\times10^{110}\omega n$, which represents a torque of $-2.84\times10^{112}\omega mN$, accounting for about 8 percent of the observed torque.

Alternatively, we may define a "field drag equivalent pressure," $P_{eq}'$ as the pressure at which the drag due to residual air molecules equals the electromagnetic drag. For the preceding experiment, $P_{eq} = 4.97\times10^{12} N/m^2 = 3.7\times10^{14}$ Torr.

These results may be compared with other field suspension systems such as the passive superconducting bearing (gyro) and servo feedback systems such as the electrostatic gyro (ESG) and ferromagnetic suspension systems. Levitation of superconducting rotors (spheres) has been reported with $P_{eq} \approx 1.2\times10^{-4}$ Torr.[10] The ESG has undergone extensive development, and while most quantitative data on stray torque are proprietary, $P_{eq}$ would appear to lie below $10^{16}$ Torr.[11] Ferromagnetic suspension principles have been applied by Beams[12] to the development of a rotor drag pressure gauge with a $P_{eq} < 5\times10^{110}$ Torr.

In subsequent runs at lower speeds, higher torques were observed in certain speed ranges which may be related to critical frequencies of the magnet assembly. Since no sensitive methods were available to balance the rotor or secure a uniform or vertically oriented magnet assembly, it should be possible to reduce magnetic drag by several orders of magnitude. Characteristic times can also be increased by increasing the load moment of inertia with respect to the diamagnet. The possibility of using laminated or expanded forms of pyrolytic graphite to raise the resistivity remains open since susceptibility work has shown that diamagnetism becomes fully developed when the crystallite size exceeds 150 to 200 A.[5]

A rough estimate of the precession rate of the rotor due to drag in the previous test can be made by noting $d\theta/dt = L_1/H = L \sin\theta/I_\omega = -k \sin\theta$, where $\theta$ is the angle between the torque and the rotational axis. If we assume $\theta \leq 10^{-3}$ rad, we obtain $d\theta/dt \leq 2.22\times10^{18}$ rad./sec. $= 4.58\times10^{13}$ deg./hr. This number could be further reduced by increasing the rotor moment of inertia. Of course the actual precession rate during the test was about 12.5° per hour due to the earth's rotation. Gyroscopic applications represent a distinct possibility, especially in outer space, where gravity reaction is absent.[13]

VI. TEMPERATURE COEFFICIENTS

The temperature dependence of susceptibility of pyrolytic graphite is given in Ref. 4. It should be possible to compensate for the temperature coefficient of susceptibility of the diamagnet by using magnetic shunting techniques to alter $dB^2/dz$ so as to hold the product $XdB^2/dz$ nearly constant.

VII. MAGNET REQUIREMENTS

In addition to the gradient of $B^2$ already discussed, the size and weight of magnet assembly required to levitate a given load is important in many applications. The magnet volume $V_m$ required to generate flux density $B$ in an airgap volume $V_a$ is given by $V_m = V_a(B^2/2\mu_o)r\sigma/B_dH_d/2)$, where $B_dH_d$ is the energy product of the magnet, $r$ is the reluctance factor, and $\sigma$ the leakage. The magnet weight is then $W_m = V_m \rho_m g$, pole piece weights being neglected. The pressure exerted on a pyrolytic graphite surface parallel to the gap edge $P = -(X/2\mu_o)B^2$ and the corresponding force $F = PA = PV_a/h$, where $A$ is the lateral area and $h$ is the pole face height. Then the ratio of magnet weight to load $W_m/L = -2p_m gr\sigma h/B_d H_d X = 3.5\times 10^4 r\sigma h(\rho_m/B_d H_d)$ for pyrolytic graphite.

To estimate the magnet weight (or volume) required to lift a which leads to $W_m/L \gtrsim 1.75 \times 10^5 w(p_m/B_dH_d)$. The figure of merit $(B_dH_d/p_m)$ for Alnico $1X^{14}$ permanent magnets $\approx$ 9.2 tesla A.m.$^2$/kg.(J/kg.) which gives a minimum weight load ratio $W_m/L \approx 1.9 \times 10^4 w$. Thus for a gap $w=1$mm. $=10^{13}$m., we have $W_m/L \approx 19$. Of course, clearance requirements increase this value somewhat.

In the magnet for bearing No. 1, no attempt was made to minimize size or weight. The assembly contained 6.12 kg. of ceramic magnets $(Indox\ V)^{14}$ and 35.9 kg. of low C steel. The gross $W_m/L = 10,920$ and a net $W_m/L = 1,590$.

APPLICATIONS

A number of applications for diamagnetic levitation appear to be promising. These may be classified into kinematic sensing, force sensing, and linkage devices.

Kinematic sensors might include linear or angular accelerometers, integrating accelerometers (velocity meters), integrating velocity meters (displacement meters), timing devices, etc. Accelerometers may use the magnetostatic field or externally applied forces to develop a restoring force, while the integrating devices can operate using a degree of freedom with infinitesimal restoring force.

Instantaneous force or torque sensors are similar to kinematic sensors in that forces acting on the suspended rotor are measured in the same manner, but the results are independent of the inertial properties of the rotor. However, integrating knife devices (impulse or momentum etc., will require inertial parameters of the rotor. Forces, precision torques, or momentum changes from electrostatic, magnetic, photon, or particulate sources may be measured. Typical devices might include radiation pressure meters, vacuum or effusion pressure gauges, and magnetic spin momentum meters.

Linkage devices are those which make use of the isolating properties of the levitation to remove extraneous influences from some desired measurement. The desired isolation may be physical (frictional), electrical, thermal, or chemical. Applications include bearings, pivots or knife edges for meters, balances, etc., ideal dielectrics for electrometers, ideal thermal insulation for precision calorimetry, and barriers to migration of adsorbed films.

APPENDIX A: EVALUATION OF OPTIMUM GAP WIDTH

To evaluate $w_{opt}$, we may differentiate $ln(L-W)$ with respect to $w$. Using the previous expression for $(L-W)$, we obtain $$\frac{d\ln}{dw}(L-W) = \frac{d\ln}{dw}V + \frac{d\ln}{dw}[-f(B)] = 0$$

where $$f(B) = \left[\frac{dB^2}{dz}\right]_{av} - \left[\frac{dB^2}{dz}\right]_{ln}.$$

But $V = Ct\Delta z = C(w-2\Delta x)\Delta z$, where $C$ is the lateral gap length, $t$ is the diamagnet thickness, $\Delta z$ is the diamagnet height, and $\Delta x$ the clearance.
then $$\frac{d\ln}{dw}V = \frac{1}{w-2\Delta x} + \frac{d\ln z}{dw}.$$

We shall next evaluate $f(B)$ and $\Delta z$. One may obtain an analytic approximation for $B=B(x,y,z)$ valid for linear or annular gaps with $w<<C$ using the formula for flux density due to uniformly magnetized infinite strip magnets.
Thus $$B = -\frac{\mu_0\gamma}{4\pi}\int_S \nabla\left(\frac{M\cdot dS}{r}\right) = \frac{\mu_0\gamma}{4\pi}\int \frac{r}{|r|^3}(M\cdot dS).$$

Then $B = B(0,y,z) = B(0,z)$ in the $y$, $z$ plane due to infinite strip magnets, $(M||x)$ of unit width $(-\infty < y/< \infty, -1/2 < z < 1/2)$ with $$|B| = B_x = \frac{\mu_0\gamma M}{4\pi}\int d\Omega = \frac{\mu_0\gamma M}{\pi}$$

$$X\left[\arctan\left(\frac{1-2z}{w}\right) - \arctan\left(\frac{-1-2z}{w}\right)\right]$$

For $z$ near $1/2$ and $2<<1$, $\arctan[(-1-2z)/2] \to -\pi/2$ and $B \approx (\mu z' o\gamma M/\pi)\ \text{arccot}\ (2z'/2) = (B_o/\pi)\ \text{arccot}\ (2z'/w)$ where $z' = z - 1/2$. If we assume $B(x,z') = B(O,z')$ in the gap region, then $$\frac{dB^2}{dz'} = 2B\left(\frac{dB}{dz'}\right) = -4\left(\frac{Bo}{\pi}\right)^2 \cdot \frac{1}{w}\left(\frac{\text{arccot}\ u}{1+u^2}\right)$$

where $u = 2z'/w$.

The gradient reaches a peak negative value at $u = u_{pn} = -0.2722$. If we let $w_o^{15}$ be the maximum value of $w$ (for which $[dB^2/dz]_{pn} = [dB^2/dz]_{ln}$), then $$\left[\frac{dB^2}{dz}\right]_{pn} - \left[\frac{dB^2}{dz}\right]_{ln} = -C_1\left(\frac{\text{arccot}\ u_{pn}}{1+u_{pn}^2}\right)$$

$$\cdot\left(\frac{1}{w} - \frac{1}{wo}\right) = -C_2\left(\frac{1}{\omega} - 1\right)$$

Where $\omega = w/w_o$. If we now assume $f(B) = -\alpha C_2(1/\omega - 1)$ where $\alpha \approx 2/3$, we note $\ln[f(B)] = C_3 + \ln(1/\omega - 1)$ and $d\ln[-f(B)]/dw = (1/w_o)[(-1)/(\omega - \omega^2)]$.

To evaluate $\Delta z$, we note that $\Delta z = (w/2)\Delta u = (w/2) \cdot (u_1 - u_2)$, where $u_1$ and $u_2$ are solutions of the equation $$\frac{\text{arccot}\ u}{1+u^2} = \frac{w}{C_1}\left[\frac{dB^2}{dz}\right]_{ln}$$

If one plots $\Delta z$ as a function of $w$ or $\omega$, one obtains a curve very closely approximating as semiellipse. By approximating $ln\Delta z = C_4 + ln(\omega - \omega^2)^{1/2}$, we obtain $$\frac{d\ln\Delta z}{dw} = \left(\frac{1}{2w_0}\right)\frac{1-2\omega}{\omega - \omega^2}$$

Finally, $$\frac{d\ln(L-W)}{dw} = \frac{1}{w_0}\left(\frac{1}{\omega - \delta} + \frac{1/2 - \omega}{\omega - \omega^2} - \frac{1}{\omega - \omega^2}\right) = 0$$

where $\delta = 2\Delta x/w_o$. Then $\omega - \omega^2 = (1/2 + \omega)(\omega - \delta)$, or $$2\omega^2 - (1/2+\delta)\omega - \delta/2 = 0$$

which gives $\omega = 14\{(1/2+\delta)+[(1/2+\delta)^2+4\delta]^{1/2}\}$. For $\delta \to 0$, $\omega 1/4$ or the optimum gap width approaches one-fourth of the maximum gap width.

APPENDIX B: EVALUATION OF OPTIMUM LOAD

An approximation to the maximum net load per unit lateral gap length may be obtained using the results of Appendix A. Thus $$\left(\frac{L-W}{C}\right)_{max} = \left(\frac{X}{2\mu_o}\right)[(V/C)f(B)] \approx \left(\frac{X}{2\mu_o}\right)$$

$$w_o(1/4-\delta)\Delta zf(B)$$

But at optimum gap width, $\Delta z = (w/2)\Delta u = (w_o/8)\cdot(u_1 - u_2)$, where $u_1$ and $u_2$ are the roots of the equation $$\frac{\text{arccot}\ u}{1+u^2} = \frac{1}{4}\left[\frac{\text{arccot}\ u_{pn}}{1+u_{pn}^2}\right] = \frac{1.710}{4} = 0.4275$$

Solution yields $u_1 = 0.948$, $u_2 = -2.326$, and $z = 0.409 w_o$. Similarly, $[dB^2/dz]_{pn} = 4[dB^2/dz]_{ln}$ and $f(B)2[dB^2/dz]_{ln}$. Then $$\left(\frac{L-W}{C}\right)_{max} = \left(\frac{X}{2\mu_o}\right)w_o^2(1/4-\delta)(0.409)2\left[\frac{dB^2}{dx}\right]_{ln}$$

Substituting the previously derived $w_o = -(0.693)B_o^2/[dB^2/dz]_{ln}$, we obtain $$\left(\frac{L-W}{C}\right)_{max} = (x/2\mu_o)(0.48B_o^4)(1/4-\delta)(0.409)(2)/$$

$$\left[\frac{dB^2}{dz}\right]_{ln} \approx 0.225 B_o^4 N/m\text{ for }\delta \to 0.$$

In accordance with the present invention, diamagnetic levitation and/or stabilizing devices may be classified as follows:

One may conveniently classify diamagnetic levitation devices according to the nature of constraints (number geometry, type, etc.) acting on the suspended member. Thus an idealized rigid body has 6° of freedom (DOF) of motion; three translational (T) DOF which may be taken as directed along a vertical and two horizontal axes and three rotational (R) DOF which may be taken either about axes fixed in space or in the suspended body. The chronology of motion (position and velocity) of any rigid body can thus be described by a superposition of six time-dependent variables.

The magnetic, gravitational, or other forces or torques acting on the suspended body may either assist, oppose, or have no effect on motions corresponding to the DOF involved resulting in energy transfer to, from, or not occurring with said body. For a system initially in equilibrium (no net forces or torques) situations described represent unstable (U), stable (S), and neutral (N) equilibrium respectively. In addition, one or more DOF may possess a periodic (P) potential energy distribution with multiple minima. Other cases of interest include nonrigid, multiply connected, and multiply independent bodies. We may use these concepts to obtain the following classification:

I. RIGID BODY
  A. Equilibrium—no U DOF
    1. ON–6S force, torque, impulse, or momentum meters, microphones, seismic and vibration meters, pivots, accelerometers, etc. (FIGS. 8 to 12)
    2. 1N–5S
      a. 1NT linear displacement meter, seismograph, level (FIG. 4)
      b. 1NR thrust bearing, angular momentum meter (FIGS. 4 and 13 to 16)
    3. 2N–4S
      a. 2NT horizontal displacement meter, seismograph (FIG. 7)
      b. 2NR two-axis gimbal, gyrocompass (FIG. 5)
      c. N1T1R sliding pivot, thrust or journal bearing (FIGS. 4 and 5)
    4. 3N–3S
      a. 3NT space displacement meter
      b. 3NR free spherical angular recorder (FIG. 6)
      c. N2T1R XY sliding pivot or bearing (FIG. 7)
      d. N1T2R sliding two-axis gimbal
    5. 4N–2S
      a. N3T1R free space translational pivot or bearing
      b. N2T2R XY sliding two-axis gimbal
      c. N1T3R sliding free spherical angular recorder
    6. More than 4N DOF
  B. Equilibrium—one or more P DOF
    1. ON–5S–1P
      a. 1PT linear step counter
      b. 1PR angular step counter
    2. On–4S–2P
      a. 2PT XY digital counter
      b. 2PR two-axis angular counter
      c. P1T1R linear-angular counter
    3. 1N–4S–1P
      a. 1NT–1PT XY digital-analog recorder
      b. 1NT–1PR sliding angular step counter
      c. 1NR–1PR–two-axis digital-analog angular recorder
      d. 1NR–1PT linear stepped thrust or journal bearing
    4. Three or more P+N DOF
  C. Nonequilibrium—one or more U DOF
    1. 1U–5S
      a. 1UT barrier switch
      b. 1UR angular (tilt) switch
    2. More than 1U DOF
II. NONRIGID BODY OR BODIES
  A. Multiple independent bodies wave node detector
  B. Multiple interconnected bodies vane electrometer
  C. Fluid or viscoelastic body.

The mathematical requirements for stable equilibrium have been presented in a preceding section—to recapitulate, the requirement for equilibrium is that all first derivatives of energy with respect to coordinates corresponding to available degrees of freedom (minimum of 6) must vanish. The conditions of stable, neutral, or unstable equilibrium with respect to any degree of freedom arise when the second derivative of energy with respect to the appropriate coordinate is positive, zero, or negative respectively.

Geometrically one may achieve equilibrium (vanishing first derivatives) by symmetry of elements; thus to achieve equilibrium with respect to a horizontal axis, it suffices to construct two equivalent sets (or halves) of elements and arrange them such that one set is related to the other by inversion through some point in space or by rotation by 180° through any axis at right angles to the given axis. Similarly, rotational equilibrium may be achieved by providing coincident symmetry planes in both stationary and suspended members.

To achieve stable equilibrium, one must provide a positive restoring force or torque to a given axis. If this axis consists of two equivalent sets, it is sufficient that the second derivative of energy of a single set with respect to appropriate coordinate be positive. For any repulsion system whose force decreases with increasing separation, the second derivative is positive over the corresponding region.

Neutral equilibrium may be achieved by appropriate symmetry of the structure; thus to achieve a neutral rotational axis, one merely constructs either (or both) stationary or suspended member with circular or cylindrical axis of symmetry, while a neutral horizontal translational axis is achieved by making either (but not both) stationary or suspended member of uniform cross section along the appropriate axis and extending some considerable distance beyond the opposite member. A neutral vertical translational axis is much more difficult to achieve as it requires a nearly constant repulsion force which exactly balances the gravitational force over a considerable height.

To achieve a periodic restoring force or torque one must couple a periodic variation in magnetic field intensity with a periodic variation in susceptance. These may be achieved by providing a periodic notched, grooved, corrugated, hollowed, or perforated surface to both stationary and suspended members.

An unstable equilibrium may be achieved by adding a single repulsive element to a neutral axis and operating at the potential maximum.

As shown in FIG. 1 of the drawings, a pair of magnets 30 and 31 are concentrically disposed about a vertical axis 32. The magnet 30 is shown fragmentarily with its north pole 33 disposed in spaced relation with a south pole 34 of the permanent magnet 31, these magnets 30 and 31 being generally hollow cylindrical structures. The north poles 33 are directed on an annular polar axis 35 disposed parallel to the magnetic lines of force and forming a substantially conical magnetic field between the north and south poles of the magnets 33 and 34 respectively. This conical magnetic field diverges downwardly since the magnetic lines of force between the north and south poles are disposed generally parallel to the conically disposed polar axis 35.

Surrounding the gap between the north and south poles is a pyrolytic graphite ring 38, this pyrolytic graphite ring 38 being a diamagnetic structure vertically loaded by an acrylic ring 40.

It will be seen that the diamagnetic ring 38 is levitated in relation to the downwardly diverging conical magnetic field between the north and south poles of the magnets 30 and 31.

Reference is now made to FIG. 4 of the drawings, wherein a permanent magnet 42 is provided with north poles 44 and south poles 46. Magnetic lines of force are directed generally parallel to axes 50 which are disposed in obtuse downwardly converging relationship to each other.

The north and south pole structures, as shown in FIG. 4, may be annular about a vertical axis 52, or the north and south pole structures may be elongated in a direction at right angles to the axis 52 and in a horizontal direction.

A diamagnetic structure 54 is disposed with its layer planes parallel to axes 56. These axes 56 are disposed generally at right angles to the axes 50. The diamagnetic structure 54 may thus be a ring-shaped element of the cross section, shown in FIG. 4, or as a modified structure, either circular or two elongated bars 54 may be connected together at opposite ends to conform with the hereinbefore-described elongated structure of the pole structures 44 and 46 in a horizontal direction at right angles to the axis 52.

As shown in FIG. 5, a magnet structure 60 is provided with a north pole structure 62 and a south pole structure 64. The north and south poles are directed generally on conical axes 66, such that magnetic lines of force are substantially parallel to these axes 66. A second permanent magnet 68 is disposed in FIG. 5, and this one is similar to the magnet 60, but slightly smaller. It is provided with a north pole structure generally designated 70, and a south pole structure 72. These north and south poles are disposed generally on conical axes 79, the axes 79 being substantially parallel to the magnetic lines of force between the north and south poles 70 and 72.

A pair of annular diamagnetic rings 76 and 78 are connected by spokes 80 to a shaft 82.

It will be seen that the rings 76 and 78 are provided with layer planes at substantially right angles to the downwardly converging axes 66 and magnetic lines of force between the north and south poles 62 and 64, and that when these rings pass between the north and south poles 70 and 72 their layer planes are also at substantially right angles to the downwardly diverging axes 79. Thus, the diamagnetic rings 76 and 78 are levitated to rotatably support the shaft 82 and led to the downward convergence of the axes 66 and the downward divergence of the axes 79. The shaft 82 is stabilized in an endwise direction while freely permitted to rotate about axis 82 or a vertical axis 83 due to levitation provided by magnetic lines of force and the relative susceptibility of the diamagnetic rings 76 and 78. These rings are preferably of pyrolytic graphite.

The layer plane axes of these rings are disposed parallel to lines 86, which lines 86 are at substantially right angles to the hereinbefore described axes 66 and 79 of the polar axes of the permanent magnets 60 and 68.

As shown in FIG. 6 of the drawings, a permanent magnet 90 is provided with a pair of north poles 92 and a pair of south poles 94. These poles are spaced apart and so directed that their polar axes are as indicated at 96, these polar axes being downwardly converging relative to each other and the magnetic lines of force being parallel thereto tend to cradle or support the diamagnetic sphere 98. This arrangement is similar to that shown in FIG. 4, wherein the ring-shaped diamagnetic member 54 is cradled in a downwardly converging or inverted conical magnetic field. The diamagnetic sphere 98 may preferably be of pyrolytic graphite.

It will be understood by those skilled in the art that the poles 92 and 94 are annular about a vertical axis 100 and that the cross section, as shown in FIG. 6, may be elongated at right angles to the axis 100 on a horizontal plane such that the north poles and south poles are elongated horizontally and that either the diamagnetic sphere may be used, or be replaced by an elongated tubular diamagnetic member, preferably made of pyrolytic graphite.

In the modification, as shown in FIG. 7, a diamagnetic sheet 102 is preferably made of pyrolytic graphite and a plurality of permanent magnets 104 are disposed in spaced adjacent relationship to each other, wherein their north and south poles are slightly spaced from each other in attraction relation to each other, and wherein spacers 106 are connected to the permanent magnets to hold them in spaced relationship to each other.

Magnetic lines of force in this instance between the permanent magnets 104 are disposed on horizontal axis 108, and the assembly of magnets are thus repulsively supported above the diamagnetic sheet 102 and may have the effect of floating the magnets 104 thereon free to move in horizontal directions.

In the modification, as shown in FIG. 8, a permanent magnet 110 is substantially C-shaped in cross section and is disposed in an attitude similar to C lying on its back, as shown in FIG. 8. Thus, the permanent magnet 110 is provided with a north pole 112 and a south pole 114, these poles extending generally in a horizontal direction, and spaced apart. A diamagnetic member 116 in the shape of a bar is adapted to be floatably supported between the poles 112 and 114 by diamagnetic levitation.

The bar 116 is provided with either vertical layer planes or a cross-sectional structure, as indicated in FIG. 12, wherein the layer planes of the diamagnetic bar 116 are disposed on downwardly converging axes 118 and 120, the bar being laminated from two bars of diamagnetic material along the line 122, thus permitting the layer plane structures to have negative magnetic susceptibility to magnetic fields in the directions of arrows 124 and 126, respectively, these being downwardly diverging so as to provide for vertical levitation thrust as well as horizontal levitation thrust force, not only to support the bar 116 vertically between the poles 112 and 114, but also to maintain lateral stabilization therein. The downwardly converging axes 118 and 120 of the layer planes of the bar 116 provides for a function similar to the downwardly converging axes 50 and 96, disclosed in FIGS. 4 and 6 of the drawings, which tends to cradle the diamagnetic member in a levitation attitude.

The bar 116, as shown in FIG. 8, is provided with enlarged end portions 130 and 132, while the north pole structure 112 is provided with relative elevated or thickened portions 134 on its opposite ends in contrast to the vertically elevated and thickened portion 136 of the south pole 114 which is directly opposite a relatively depressed section between the elevated portions 134. Thus, the central portion of the bar 116 may respond to the permanent magnetic field, having longitudinal steps therein, occasioned by the differences in the areas of the pole pieces 112 and 114 at their raised portions 134 and 136. In this manner, the bar 116 is stabilized in movement across its longitudinal axis. The repulsive force exerted on the enlarged end portions 130 and 132 by the permanent magnet serve to stabilize the bar in a direction along its longitudinal axis.

In the structure, as shown in FIG. 11, a bar 140 is similar to the bar 116, but this bar 140 is somewhat shorter than a permanent magnet 142, which is similar in cross-sectional shape to the permanent magnet 110. This permanent magnet 142 is provided with north and south poles 144 and 146 spaced apart, and the poles 144 at their opposite ends are substantially elevated and thickened at 148. Similarly the south pole is thickened at 150 near each end by an elevated portion opposite ends 152 and 154 of the bar 140, which is disposed between the elevated portions 148 and 150 at opposite ends of the permanent magnet to thereby provide for endwise stabilization of the longitudinal axis of the bar 140; it being understood that the cross-sectional layer plane structure of the bar 140 is similar to that disclosed in FIG. 12 and the bar 116, hereinbefore described.

In the modification of the invention, as shown in FIG. 13, an annular assembly of structure is disposed about a vertical axis 160. This structure comprises a pair of permanent magnets 162 and 164 which are annular about the vertical axis 160. The magnet 162 is provided with an annular south pole 166 which surrounds an annular north pole 168 thereof. The permanent magnet 162 is connected by radiating structure 170 to a rotating shaft 172 which rotates about the axis 160.

Directly below the permanent magnet 162 is the permanent magnet 164, having an annular south pole 174 surrounding an annular north pole 176 thereof, the south pole 174 opposing the north pole 166 and the north pole 176 opposing the south pole 168, causing upward repulsion of the magnet 162 relative to the magnet 164, which is stationarily supported on a plane 178.

Carried by a shaft 172 is a sleeve 180, as shown in FIG. 14 of the drawings; this sleeve 180 is provided with a plurality of permanent magnets 182 superimposed relative to each other and being annular in form around the axis 160 of the shaft 172. These magnets 182 are alternately disposed with north and south poles at the peripheries 184 of the magnets 182, and these peripheries are adjacent to a face 186 of a layered anisotropic pyrolytic graphite structure 188. It will be seen that the pyrolytic graphite structure is a diamagnetic member, or plurality of members, or it may be an annular structure, tending to stabilize the disposition of the magnet 162 and shaft 172 concentrically relative to the axis 160.

An upper end of the shaft 172 carries a series of permanent magnets 190 similar to the magnets 182, and these magnets 190 are disposed adjacent to layered anisotropic pyrolytic graphite structures 192, which may be a plurality of spaced elements or an annular structure, as desired. Thus, both upper and lower ends of the shaft 172 are concentrically stabilized about the axis 160. In the modification, as shown in FIG. 15, a pair of permanent magnets 196 and 198 are similar to the hereinbefore described magnets 162 and 164. Secured to the magnet 196 and extending radially therefrom are a plurality of permanent magnets 200 which are similar to the magnets 182, as shown in FIG. 14. These magnets 200 are disposed in spaced relation radially to pyrolytic graphite structures 202 which have the same stabilizing effect as the pyrolytic graphite structures 188 and 192 hereinbefore described in connection with FIG. 13 of the drawings.

As shown in FIG. 16, a pair of annular permanent magnets 206 and 208 are disposed concentrically relative to each other. These permanent magnets are provided with respective north poles 210 and 212 and respective south poles 214 and 216. These magnets 206 and 208 are annular and symmetrical about a vertical axis 220. The north poles tend to repel the north poles, and the south poles repel the south poles, all of which causes the magnet 208 to seek a concentric position relative to the magnet 206, and provides very substantial resistance to movement of the magnet 208 relative to the magnet 206 in a direction at right angles to the axis 220, while the vertical offset of the poles provides an unstable vertical levitating force, i.e., the force increases with increasing displacement of the magnet 208. An annular assembly of permanent magnets 224, similar to the magnets 182, are directed with their alternate poles toward a pyrolytic graphite plate 226 disposed horizontally. The repulsive force of the magnets 224 tends partially to support the weight of the magnet 208, but by decreasing very rapidly with increasing separation from the plate 226, serves to stabilize the vertical position of the levitated assembly.

Attention is directed to FIG. 17, and the modification disclosed therein, which is adapted to achieve a periodic restoring force or torque, and to accomplish this, one must couple a periodic variation in magnetic field intensity with a periodic variation in susceptance. These functions may be attained by providing a periodic notched, grooved, corrugated, hollow or perforated surface to both stationary permanent magnets, and suspended diamagnetic members.

Referring to FIG. 17 specifically, it will be seen that a permanent magnet 230 is provided with a central pole structure 232 and a surrounding pole structure 234. The surrounding pole structure 234 is provided with an annular wall portion 236 which surrounds an annular upstanding wall portion 238 of the pole 232. Both the wall portions 236 and 238 are provided with a series of radially disposed notched portions, while a diamagnetic ring 240 is also provided with a plurality of alternate notch and groove structures 242. The diamagnetic ring 240 is normally levitated between the pole structures 232 and 234, and the notch structures 242 in relation to the radially notched structures 236 and 238 provides for the periodic restoring force or torque above referred to. It will be appreciated by those skilled in the art that structures equivalent to those shown in FIG. 17, may include a diamagnet having a series of openings spaced from each other, and disposed in an annular row through the diamagnetic ring so as to provide a variation in mass, and that the notch structures 242 or any other alternate mass distribution in the diamagnet, as well as in the permanent magnet, may be utilized to afford the periodic restoring force or torque, hereinbefore referred to.

It will be appreciated that the notched structures 236 and 238 may correspond in spacing and alignment with the notched structure 242 of the diamagnetic ring 240. Thus, these notch structures or equivalent variations in mass, as well as magnetic field strength, may coincide, and may be such that alignment of these structures radially may occur in order to attain the periodic restoring force or torque desired.

Further it will be understood that linear devices, in accordance with the invention, may achieve periodic restoring forces. As for example, structures as described in FIGS. 4 and 11, may utilize elongated bars or other members of diamagnetic material disposed between downwardly converging magnetic fields, and these fields may be formed by notched or other field structures providing spaced variations in magnetic field strength.

This modification of the invention may thus provide for levitation of instruments requiring certain incremental movements of the levitated element, particularly the diamagnetic element.

It will be appreciated from the foregoing that diamagnetic levitation and stabilizing devices of the invention provide levitation as well as stabilization, either by utilizing a downwardly converging or diverging magnetic field with annular structures or bar structures, whereby the diamagnetic material may be cradled in a downwardly diverging magnetic field, or on the outside of conical magnetic field, as hereinbefore described. Further, that orientation of the layer planes of the diamagnetic material, such as shown in FIG. 12, also provide for a downwardly diverging susceptibility to magnetic lines of force not only to provide for horizontal components of force acting on the diamagnetic material, but also sufficient vertical components of force so as to support the same, and suspend it freely in magnetic field.

Further, it will be understood that permanent magnets may be used for carrying substantial vertical loads, as shown and described in FIG. 13 of the drawings, and that diamagnetic stabilization may be provided for such loading carrying permanent magnets disposed in repulsion relation to each other. Additionally, it will be recognized that permanent magnets may be used to provide very stiff actions of revolution to support a shaft concentrically on a given axis and that diamagnetic means, such as shown in FIG. 6, afford excellent end play stabilization for concentric permanent magnets used in powerful repulsion-locating relationship to each other.

In accordance with the present invention, a frictionless pivot is provided by the structure, as shown in FIGS. 8, 9, 10, 11 and 12. This structure comprises a restoring force for horizontal translation parallel to the pole face which may be provided by an overhanging section of the diamagnetic bar 116 projecting beyond the magnet structure, as indicated in FIG. 8, or into a low field region, or by an extension of the magnet poles beyond the diamagnet, as indicated in FIG. 11 of the drawings, or by increased field strength due to a change in magnetic material, pole face shape, or gap clearance, all as will be apparent from the foregoing disclosure to anyone skilled in the art.

Restoring force for translation perpendicular to the pole face may be provided by alternate regions of inclination of magnetic flux lines above and below a means horizontal direction by corresponding elevations and depressions of the pole faces of the magnets 110 and 142, and of inclinations of the pole faces in alternate directions from the vertical; or by using the laminated diamagnet shown in FIG. 12, whose layer planes are inclined so as to be more nearly perpendicular to the magnetic flux lines as they relate to the vertical surfaces.

Restoring torques for rotational degrees of freedom generally follow from the horizontal stabilization providing the center of gravity of the suspended member, which includes the structure attached to the diamagnet is not too high.

The devices, as shown in FIGS. 13, 14, 15 and 16, are especially suited to applications requiring levitation of heavy loads where the size of purely diamagnetic bearings would be prohibitive. In these cases, the diamagnetic structure is not required to furnish any appreciable force, but only stiffness. For this requirement, it is desirable to maximize the surface area of the diamagnet and narrow the characteristic gap length so as to increase stiffness. An effective structure for this purpose is a laminated structure of thin permanent magnets, such as the assembly 182, shown in FIG. 14 of the drawings, and such magnets are preferably PtCo, $YCo_5$, barium ferrite, high coercive alnico, Cunife, Vicalloy, etc., of alternating polarity whose free poles provide an external field which drops exponentially with a characteristic length comparable to the magnetic thickness or spacing. Opposing structures of this type will provide useful stiffnesses against diamagnetic surfaces at clearances comparable to the spacing.

The hereinbefore described permanent magnets may be readily replaced by a steady static or static-type electromagnet.

It will be apparent that horizontal and vertical components of force result from the relationship between the layered diamagnetic material and the flux lines of force of the magnet means of the invention, as hereinbefore disclosed.

From the foregoing, it will be appreciated that the invention contemplates diamagnetic levitation and stabilizing devices to provide for 6° of freedom in a stable, neutral, unstable, or periodic equilibrium condition.

It will be obvious to those skilled in the art that various modifications of the present invention may be resorted to in a manner limited only by a just interpretation of the following claims.

I claim:

1. In a diamagnetic stabilization device, the combination of: a pair of permanent magnets having pole structures disposed such that one of said magnets is energized to a position spaced from the other along a first substantially vertical axis; a third permanent magnet means coupled to said one of said permanent magnets; and a layered anisotropic diamagnetic means coupled to the other of said pair of magnets and disposed in proximity to said third permanent magnet means for stabilizing it and said one of said permanent magnets along said first axis.

2. The invention, as defined in claim 1, wherein: said one of said magnets is levitated repulsively in relation to the other of said pair of permanent magnets, and said diamagnetic means stabilizes said one of said permanent magnets in more than two directions horizontally.

3. The invention, as defined in claim 1, wherein: said pole structures comprise a pair of opposing north and south poles disposed, whereby they provide a downwardly diverging magnetic field and a diamagnetic means having connected opposed portions disposed outwardly relative to said poles and repulsively cradled about said downwardly diverging field.

4. In a diamagnetic levitation device, the combination of: a permanent magnet means having a longitudinally elongated structure with sections disposed to provide zones of magnetic flux lines alternately inclined to the horizontal axis and a layered anisotropic diamagnetic means with layer planes angularly disposed to said magnetic flux lines freely levitated and stabilized parallel to the mean direction of magnetic flux lines; said permanent magnet means having opposite end structures adapted to exert forces greater than at a median point thereof; said diamagnetic structure being provided with opposite ends repulsively energized by said magnet means to thereby stabilize said diamagnetic means in a direction at right angles to the magnetic lines of force between said north and south pole structures.

5. The invention, as defined in claim 4, wherein: said diamagnetic structure is provided with enlarged opposite end portions disposed adjacent opposite ends of said magnet means to provide stability in a direction at substantially right angles to said magnetic lines of force directed between said poles 6. The invention, as defined in claim 1, wherein: said third permanent magnet means comprising a plurality of adjacent prominent magnets having an assembly of their north and south poles alternately disposed in one direction and are located adjacent said diamagnetic means, said assembly of poles in close proximity to said diamagnetic means.

7. In a diamagnetic levitation device, the combination of: a permanent magnet having opposed spaced north and south pole structures having their polar axes disposed angularly relative to the vertical; and a diamagnetic structure repulsively suspended between said pole structure having first and second sections, each of said sections having layer structure, the layer structure having layer planes disposed at an angle to the horizontal, and having flux lines susceptibility generally disposed at right angles to said planes, said planes disposed angularly relative to each other, such that the layer planes of one section converge downwardly toward that of the other section, and toward an area between said pole structures; said diamagnetic structure being elongated in a direction at right angles to magnetic lines of force between said north pole and south pole structures said downwardly converging layer planes tend repulsively to levitate and stabilize said diamagnetic structure laterally between said pole structures.

8. The invention, as defined in claim 7, wherein: opposite ends of said diamagnetic structure are provided with enlarged portions repulsively energized by said magnet means.

9. The invention, as defined in claim 7, wherein: said magnet means are provided with enlarged portions having substantially increased field strength adjacent to and projecting beyond opposite ends of said diamagnetic structure; said diamagnetic structure being disposed between said opposite ends of said magnet.

10. In a diamagnetic levitation device, the combination of: a static magnet means having spaced pole structures disposed with their polar axes directed to exert combined forces with flux lines of force disposed at angles relative to both the vertical and horizontal directions; and a layered anisotropic diamagnetic means located in repulsive disposition relative to said static magnet means and responsive to said combined forces of said static magnetic means to thereby maintain said layered anisotropic diamagnetic means in free suspension; layered planes of said layered anisotropic diamagnetic means disposed at an angle to the flux lines of force of said static magnet means, whereby said diamagnetic means is levitated vertically and stabilized horizontally; said pole structures comprising a pair of opposing annular spaced-apart north and south poles having a first polar axis, and a second pair of opposing annular spaced-apart north and south poles having a polar axis common to said first polar axis providing a pair of relatively converging magnetic fields about said polar axes and a diamagnetic means having a pair of connected annular structures having a second common axis and disposed at an angle to said first-mentioned polar axis, said connected annular structures being repulsively cradles between said converging fields of said prominent magnet and freely rotatable about both of said axes relative to said magnet means.

11. In a diamagnetic levitation device, the combination of: a static magnet means having spaced pole structures disposed about a symmetry axis and adapted to impose combined forces having radial and axial components relative to said symmetry axis; and a layered anisotropic diamagnetic means having layer planes disposed at an angle to said magnetic lines of force and in repulsive disposition relative to said static magnet means and responsive to said combined radial and axial forces to thereby maintain said layered anisotropic diamagnetic means in more than two directions to stabilize said diamagnetic means laterally relative to said symmetry axis and said axial components of forces acting to stabilize said diamagnetic means along said symmetry axis, said diamagnetic means freely movable about said symmetry axis; said pole structures comprising a pair of opposing north and south poles having a first common polar axis disposed in inclined relation to the horizontal, said poles being in annular form, one surrounding the other to provide a downwardly converging substantially conical magnetic field; and a diamagnetic means repulsively cradled in said downwardly converging conical field, and freely rotatable about one axis relative to said magnet means; said diamagnetic member being annular and concentric with said annular magnet means.

75

UNITED STATES PATENT OFFICE
CERTIFICATE OF CORRECTION

Patent No. 3,597,022           Dated August 3, 1971

Inventor(s) Robert D. Waldron

It is certified that error appears in the above-identified patent and that said Letters Patent are hereby corrected as shown below:

Column 1, line 64, cancel "6°" and insert -- 6 degrees --; line 75, after the word "invention", insert -- may be apparent from the following specification, appended -- . Column 2, line 55, cancel "diagrammatic", and insert -- diamagnetic -- ; line 58, cancel "polycrystal line", and insert -- polycrystalline -- ; line 75, after "between", insert -- materials with unequal permeability may be evaluated using -- . Column 5, line 12, cancel "6°", and insert -- 6 degrees -- ; line 75, after the word "value", insert -- ($\omega_o$ = 10.3 sec$^{-1}$)or $P_o$ = 3.86 x 10$^{-9}$ W. A kinetic theory calculation of the momentum transfer by residual air between the rotor and the wall gives d(m$\Delta$v)/dt = -- . Column 6, line 75, after "a", insert -- gross Load $_L$, we note that the minimum practical gap height is limited by excessive leakage and reluctance due to stray flux. For practical purposes we may assume r$\sigma$h$\gtrsim$ 5w -- . Column 9, line 2, delete "6°" and insert -- 6 degrees -- . Column 15, line 71, delete "prominent" and insert -- permanent -- ; line 21, cancel "6°" and insert -- 6 degrees -- . Column 16, line 49, cancel "prominent" and insert -- permanent -- .

Signed and sealed this 14th day of November 1972.

(SEAL)
Attest:

EDWARD M. FLETCHER, JR.
Attesting Officer

ROBERT GOTTSCHALK
Commissioner of Patents